Feb. 10, 1931.   W. F. AYERSMAN   1,791,699
GLARE SHIELD FOR AUTOMOBILES
Filed Aug. 21, 1928
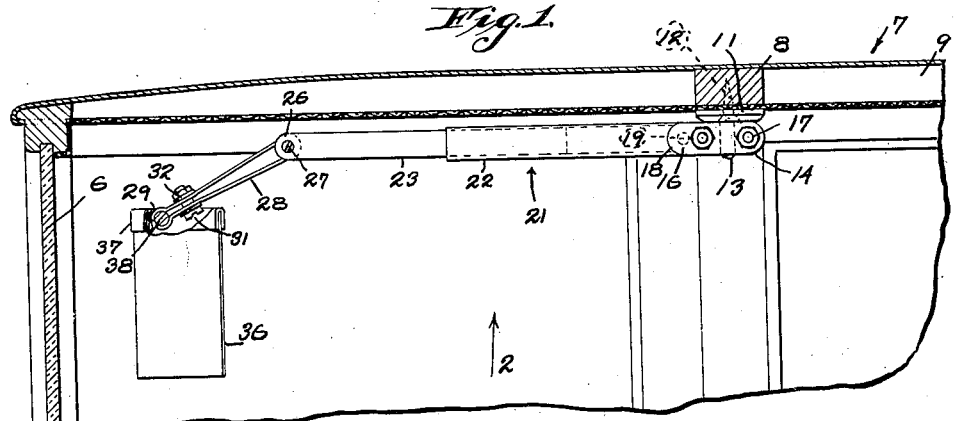
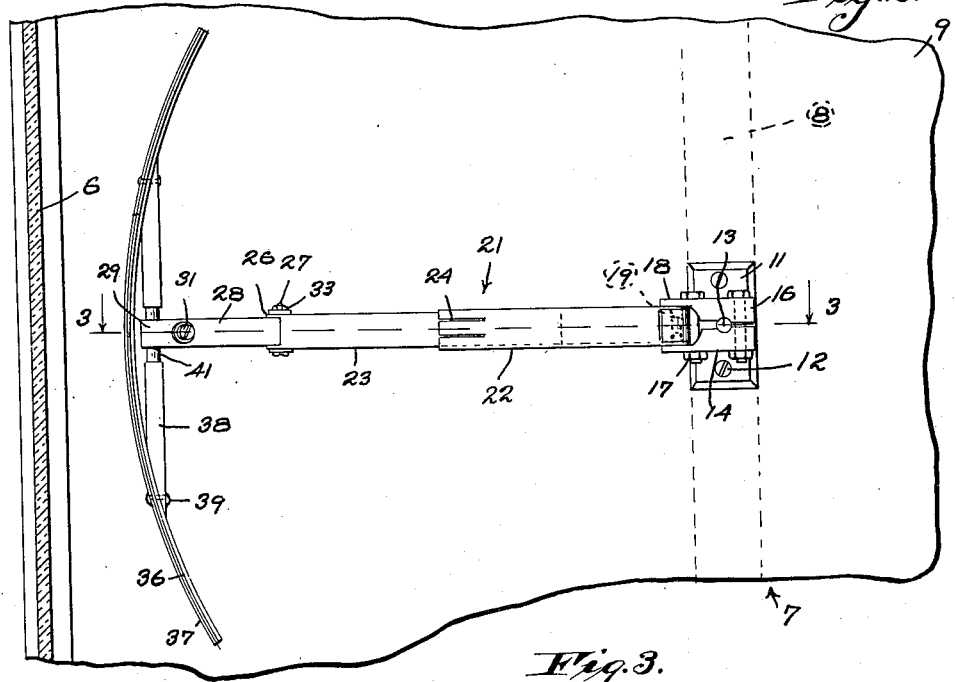
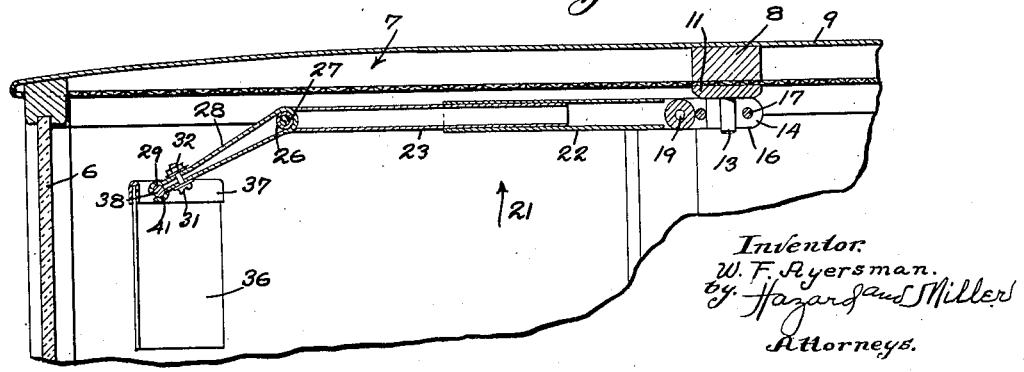
Inventor:
W. F. Ayersman.
by Hazard and Miller
Attorneys.

Patented Feb. 10, 1931

1,791,699

UNITED STATES PATENT OFFICE

WILLIAM F. AYERSMAN, OF SANTA BARBARA, CALIFORNIA

GLARE SHIELD FOR AUTOMOBILES

Application filed August 21, 1928. Serial No. 301,072.

This invention relates to glare shields, and more especially to that type of glare shield adapted for use to protect the eyes of vehicle drivers.

An object of the invention is the provision of a glare shield possessed of constructional refinements, whereby the desirability of the device is enhanced by adding to the pleasure and decreasing the danger associated with driving such vehicles as automobiles.

A more detailed object is the provision of a glare shield composed of a transparent screen colored so as to absorb certain of the rays of light which tend to blind the driver of a vehicle, and provided with novel means for positioning the screen optionally before the eyes of the driver for use, or withdrawn from such position when not in use.

A further object is the provision of a glare shield of the general character described, so mounted as to be instantly available whenever desired.

A still further object is the provision of a glare shield having novel mounting means of such a nature that any desired adjustment thereof may be effected expeditiously to properly position the device to yield the utmost convenience to the individual driver.

A still further object is the provision of a glare shield and mounting means as described, which is of exceedingly light construction and capable of various adjustments, and yet which is of such rigid character that vibration and consequent unpleasant rattling thereof is substantially obviated.

With the foregoing and other objects in view which will be made manifest in the following detailed description and specifically pointed out in the appended claims, reference is had to the accompanying drawings for an illustrative embodiment of the invention, wherein:

Figure 1 is a vertical sectional view taken longitudinally of the upper front part of the body of an automobile and showing the glare shield of my invention in side elevation.

Fig. 2 is a bottom plan view of the device, the direction of view being indicated by the arrow 2 of Fig. 1.

Fig. 3 is a longitudinal, vertical sectional view, the plane of section being taken upon the line 3—3 of Fig. 2.

In terms of broad inclusion, the glare shield of my invention comprises a colored, transparent screen, and means for securing the screen to the top of the vehicle, these securing means being so constructed as to afford various adjustments to properly position the glare shield according to the requirements of the individual driver.

Specifically describing the invention in its preferred form, I have shown the device installed in operative position closely behind the windshield 6 of an automobile 7 of the closed-body type. When installing the device in this type of vehicle, it is intended that the mounting means shall be rigidly secured to one of the transverse members 8 of the top of the body 9.

I wish it to be understood however, that the device is of equal utility in an open car, and that when installed upon this type of vehicle, the mounting means are to be secured to one of the transverse ribs upon which the flexible top is supported.

The mounting means comprises a flat, and preferably ornamental plate 11 adapted to be secured to the transverse member 8 by a plurality of screws 12 or their equivalent. A vertical pivot pin 13 is disposed rigidly upon the plate 11 depending therefrom when the plate 11 is secured in position.

Frictionally engaged upon the pin 13 is a clamp 14. Preferably this clamp is composed of a pair of similar or identical members 16 retained in position upon opposite sides of the pivot pin 13 by a pair of clamp bolts 17 which may be adjusted to vary the degree of friction against relative movement of the clamp 14 and pin 13. Each member 16 is provided upon its forward end with a finger 18; and the fingers 18 have formed thereon, preferably integrally, opposed pivot pins 19 for the pivotal reception of an arm 21.

The arm 21 is preferably composed of light, yet rigid metal such as aluminum or one of its alloys, and comprises a plurality of sections 22 and 23 telescopically connected. The outer end of the section 22 is provided with a suitable number of slits 24, permitting the end to be sprung inwards to impose spring tension upon the outer member 23 so that a certain amount of frictional resistance is offered to the relative movement of the parts of the arm 21.

The end of the outer member 23 has its sides 26 projecting beyond the termination of the top and bottom, for the reception of a horizontally disposed pivot bolt 27 upon which a link 28 is mounted for pivotal movement. This link 28 may be formed conveniently from a flat strip of metal preferably similar to that of which the arm 21 is made, and bent to U-shape. The bolt 27 is disposed between the legs of the U, and the opposed outer ends of the legs are rounded to provide a socket 29. The legs of the U may be pressed together by a bolt 31 and its nut 32, to collapse the socket; and a nut 33 provides convenient means for increasing the frictional resistance against relative movement of the link 28 and arm 21.

The screen 36 of my glare shield, comprises a colored, transparent sheet of any suitable material. Preferably however, this portion of the screen is composed of non-shatterable material such as celluloid, so that danger of fracture thereof is eliminated. This feature also decreases the weight of the entire device. The color of the screen 36 is such that it is capable of absorbing the rays of light which tend to blind, certain shades of green being particularly adaptable for this use. The screen 36 is supported in a channel-shaped rib 37, preferably of the same light metal as that of which the arm 21 and link 28 are composed and crimped about the upper edge of the screen 36 to securely hold it in place. The screen 36 and channel 37 are bent to arcuate form, the arc described by these members being of such size and so positioned that the pin 13 is substantially at the center of this arc.

A rod 38 is rigidly secured to the channel 37 as by rivets 39, and is arranged as a chord of the arc described thereby, as clearly shown upon Fig. 2. A rounded portion 41 is provided at the center of this rod 38, to be received within the socket 29 of the link 28, to frictionally retain the screen 36 in adjusted position in respect to the link 28.

While driving during the day or at such other times that the glare shield is not desired for use, it is intended that the device shall be pushed upwards so that the arm 21 is closely adjacent the under side of the top 9 of the vehicle. This results in positioning the screen 36 above the line of sight of the driver. When it is desired to protect the eyes of the driver from light such as that emanating from the rising or setting sun, or from the headlights of vehicles approaching from the opposite direction, the shield is instantly available to be pulled downwards until the screen 36 is interposed between the source of undesired light and the eyes of the driver. Thus the screen will prevent blinding the driver, but will permit him to see the road and objects thereupon, to properly guide his vehicle. It is intended that these adjustments shall be effected by swinging the arm 21 about its pivot pins 19 in respect to the clamp 14.

When it happens that the source of undesired light is not directly ahead of the vehicle, it is possible to swing the arm 21 about the pin 13 so that the screen 36 is shifted laterally the proper distance to afford the desired protection for the driver. Having the screen rounded as described, permits this lateral adjustment about the pin 13, regardless of the proximity of the screen 36 and channel 37, to the windshield 6 of the vehicle.

The provision of the link 28 permits the proper positioning of the screen 36 within the line of sight of the driver, with the arm 21 disposed at a sufficient height to avoid interference therewith by the head or hat of the driver; and the provision of the arm 21 as a plurality of telescopically connected sections, permits adjustment of the screen 36 to any desired position between the windshield 6 and head of the driver.

I claim:

1. In a glare shield for a vehicle, a screen comprising a channel-shaped rib bent to arcuate form, a rod rigid therewith and arranged as a chord thereof and having a rounded portion, a supporting link frictionally engaging said rounded portion, and a sheet of colored transparent material gripped by said channel-shaped rib.

2. In a glare shield for a vehicle, a screen comprising a channel-shaped rib bent to arcuate form, a rod rigid therewith and arranged as a chord thereof and having a rounded portion, a sheet of colored transparent material gripped between the sides of said channel-shaped rib, and supporting means frictionally engaging said rounded portion and extending to a point adacent the center of the arc described by said rib.

In testimony whereof I have signed my name to this specification.

WILLIAM F. AYERSMAN.